(No Model.)

S. O. NICHOLS.
WHIFFLETREE HOOK.

No. 397,201. Patented Feb. 5, 1889.

Witnesses:
Sara C. Branch,
Hannah D. Chase,

Inventor:
Samuel O. Nichols
By Oliver E. Branch
his Attorney.

UNITED STATES PATENT OFFICE.

SAMUEL O. NICHOLS, OF WEARE, NEW HAMPSHIRE.

WHIFFLETREE-HOOK.

SPECIFICATION forming part of Letters Patent No. 397,201, dated February 5, 1889.

Application filed March 10, 1888. Serial No. 266,914. (No model.)

*To all whom it may concern:*

Be it known that I, SAMUEL O. NICHOLS, a resident of and citizen of Weare, in the county of Hillsborough and State of New Hampshire, have invented a new and useful Improvement in Whiffletree-Hooks, of which the following, taken in connection with the accompanying drawings, is a specification.

My invention relates to improvements in whiffletree-hooks; and it consists, mainly, of an ordinary whiffletree-hook with a pin or bolt which slides in a hole made in the whiffletree exactly opposite the end of the hook, the pin or bolt being attached to a strap-spring on the back of the whiffletree, the hook and pin forming, when in place, a completely-closed and safe link.

Figure 1:
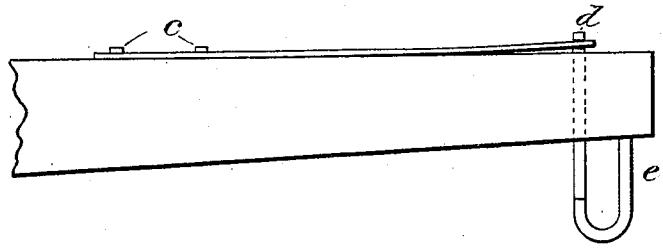
Figure 2:
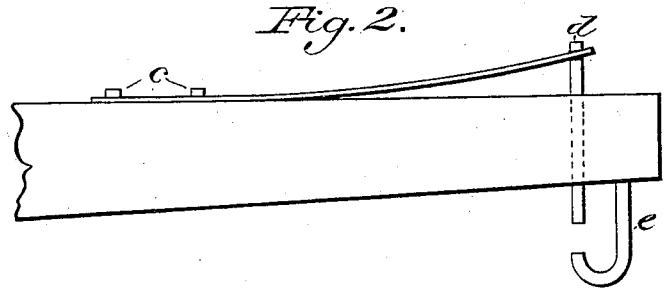
Figure 3:
Figure 4:
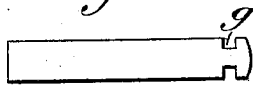

The construction and operation of my invention are described as follows:

Figure 1 represents a front view of my hook attached to a whiffletree, the hook being closed. Fig. 2 is the same view, the hook being thrown open. Fig. 3 represents the spring which holds the sliding pin or bolt $d$ in place, and Fig. 4 represents the sliding bolt or pin $d$.

The pin $d$ is of the same diameter as the end of the hook $e$, and the end of the pin and the end of the hook are made to fit exactly. The spring C is forked at the movable end, as at $f$, and the pin $d$ is slotted very near the head on two sides, as at $g$. In making, the spring C, which in Fig. 1 is in view, should be let into the wood so that when in place its face is flush with the surface of the wood. The forked end of the spring slips onto the head of the pin $d$ through the slots, the other end being fastened, as at $c$.

When the harness trace or tug is to be attached, the pin $d$ is drawn or forced back, as in Fig. 2, and is pressed forward and held in place by the spring.

The advantages of my hook are obvious. It holds the tug or trace so that it cannot become detached or unhooked accidentally; nor will the hook catch the reins, the horse's tail, bushes, brush, or sticks. The sliding pin being of the same size throughout as the end of the hook, and the spring which holds it being on the back side of the whiffletree and let into the wood or pressed closely against it, the pin cannot be shoved back so as to open the hook when the whiffletree is dragged over the ground.

Having described my invention, I claim as new and desire to secure by Letters Patent—

The whiffletree-hook herein described, consisting of the hook E, the movable pin $d$, in combination with the strap-spring $c$, constructed in the manner and for the purpose specified.

In testimony whereof I have signed my name to this specification, in the presence of two subscribing witnesses, on this 3d day of March, A. D. 1888.

SAMUEL O. NICHOLS.

Witnesses:
OLIVER E. BRANCH,
S. C. BRANCH.